W. R. PATTEN.
PULLEY.
APPLICATION FILED OCT. 12, 1910.

1,168,907.

Patented Jan. 18, 1916.

Witnesses

Inventor
W. R. Patten
By Chas. E. Brock
Attorney

UNITED STATES PATENT OFFICE.

WILLIAM R. PATTEN, OF NEW YORK, N. Y.

PULLEY.

1,168,907. Specification of Letters Patent. Patented Jan. 18, 1916.

Application filed October 12, 1910. Serial No. 586,776.

*To all whom it may concern:*

Be it known that I, WILLIAM R. PATTEN, a citizen of the United States, residing in the city of New York and State of New York, have invented a new and useful Improvement in Pulleys, of which the following is a specification.

This invention relates generally to pulleys and more particularly to a split pulley formed of sheet metal, the object being to provide a cheap, simple and efficient sheet metal pulley composed of a two-part rim portion and a two-part hub portion connected together in a strong and durable manner.

Another object of the invention is to provide a pulley of such construction that a thoroughly operative pulley of small size can be made.

With these objects in view, my invention consists essentially in providing a sectional hub of sheet metal having integral spoke members and another object is to provide a two-part rim section so constructed and arranged as to engage and interlock with the spoke members thereby providing a compact sheet metal pulley.

The invention consists also in certain novel features of construction and combination all of which will be described hereinafter and pointed out in the claims.

Figure 1:
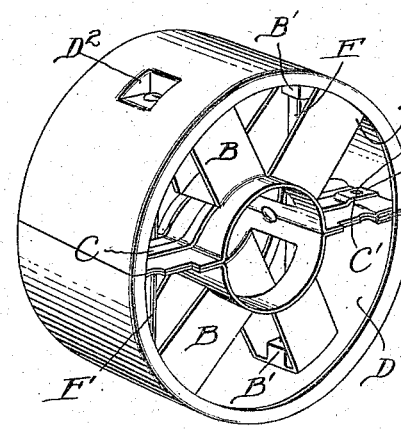
Figure 2:
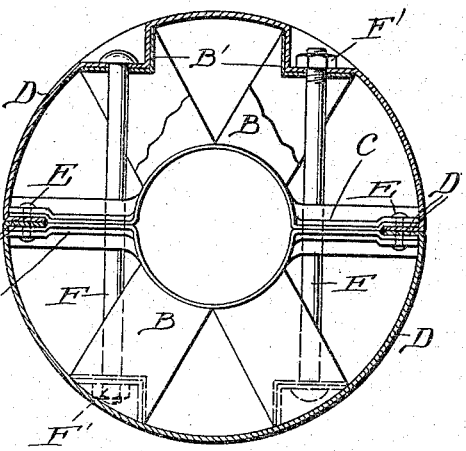
Figure 3:
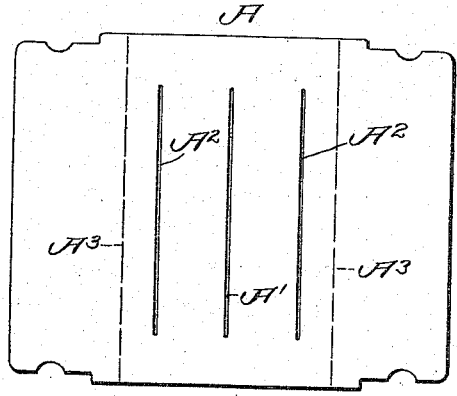
Figure 4:
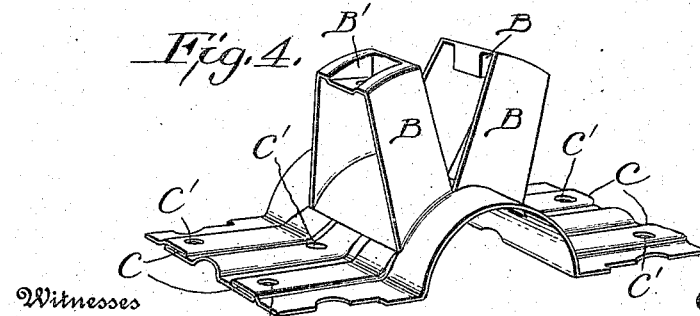
Figure 5:
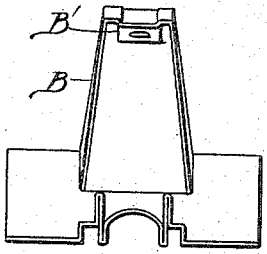

In the drawings, forming a part of this specification—Figure 1 is a perspective view of a pulley constructed in accordance with my invention. Fig. 2 is a vertical sectional view of the same certain parts being shown in elevation. Fig. 3 is a plan view of the blank from which a hub section is formed. Fig. 4 is a detail perspective view showing one of said hub sections and, Fig. 5 is a view showing a slightly modified form of a hub section.

In constructing a split pulley in accordance with my invention, I form each hub section by providing first a rectangular shaped blank A having a central slit A' and slits $A^2$ arranged upon opposite sides thereof all of said slits being arranged transversely and parallel to each other. This blank shaped and slitted as described is punched or otherwise struck up into the shape illustrated in Fig. 4, the end portions beyond the dotted lines $A^3$ remaining straight while the portion between the lines $A^3$ is curved to conform to the shaft upon which it is intended to fasten the pulley and in striking up these hub sections the portions between the slits are forced outwardly in radial lines providing integral spoke members B and at the end of each spoke member is produced a socket or depression B'.

In order to take up the surplus metal of the end portions, the said end portions are folded or lapped over as shown at C, thereby providing reinforcing or strengthening ribs extending radially from the curved or hub portion proper and these folded or corrugated portions are apertured as shown at C' for a purpose hereinafter fully described. It will be understood that two such sections are employed and when arranged in pairs constitute a complete hub with radiating spoke members. The rim is composed of two semi-circular sections D, the ends thereof being turned inwardly as shown at D' and brought together between the corrugated and folded ends of the hub sections and are secured to said members by means of bolts or rivets E. Each rim section is also formed with circumferential depressions $D^2$ so arranged and of such size and shape as to engage and fit snugly within the depressions B' formed in the outer ends of the spoke members B and bolts F passing through said rim and spokes securely fasten the sections of the pulley together and bind the same upon the shaft, nuts F' being screwed upon the inner ends of said bolts as most clearly shown in Fig. 2.

It will thus be seen that I provide a pulley composed of a plurality of hub sections and a plurality of rim sections, the hub sections having integral spoke members which engage and co-act with the rim sections, one set of bolts engaging all of the parts thereby providing a strong, durable, and compact form of pulley which can be economically produced in small sizes as well as the larger sizes.

It will be obvious that various forms of hub and spoke sections can be employed and it is also obvious that the number of integral spoke sections can be utilized without departing from the broad principle of my invention which involves the method of constructing a sheet metal pulley as well as the details of construction of said pulley.

Having thus fully described my invention, what I claim as new and desire to secure by Letters Patent, is:—

1. A pulley comprising two rim sections having oppositely disposed depressions, and a pair of hub sections having integral spokes, the outer ends of said spokes being up-set to receive the rim depressions, bolts passing through the depressed portions of rim sections and upset ends of spokes, and nuts upon the projecting ends of said bolts, the heads of bolts and nuts resting within the rim depressions, as set forth.

2. A pulley comprising rim sections having oppositely-disposed depressions and inwardly extending end portions, hub sections having integral spokes, one set of spokes having upset ends adapted to engage the rim depressions, the other set of spokes being adapted to engage the inwardly extending end portions, and bolts passing through the rim sections and spokes as set forth.

WILLIAM R. PATTEN.

Witnesses:
ANNA N. RECHTWEG,
E. L. MINTON.